(12) United States Patent
Intile

(10) Patent No.: US 8,322,141 B2
(45) Date of Patent: Dec. 4, 2012

(54) POWER GENERATION SYSTEM INCLUDING A FIRST TURBINE STAGE STRUCTURALLY INCORPORATING A COMBUSTOR

(75) Inventor: John Charles Intile, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/007,191

(22) Filed: Jan. 14, 2011

(65) Prior Publication Data

US 2012/0180499 A1     Jul. 19, 2012

(51) Int. Cl.
F02C 3/16     (2006.01)

(52) U.S. Cl. .......... 60/735; 60/805; 60/39.17; 60/39.37; 60/752; 60/722

(58) Field of Classification Search ............ 60/752–760, 60/722, 735, 39.37, 39.43, 39.44, 39.52, 60/806, 39.17, 805
See application file for complete search history.

(56) References Cited

U.S. PATENT DOCUMENTS

| 3,309,866 | A | * | 3/1967 | Kydd | 60/772 |
|---|---|---|---|---|---|
| 5,003,766 | A | * | 4/1991 | Paul | 60/39.15 |
| 5,490,377 | A | * | 2/1996 | Janes | 60/39.12 |
| 5,581,997 | A | * | 12/1996 | Janes | 60/39.12 |
| 5,590,518 | A | * | 1/1997 | Janes | 60/39.12 |
| 5,881,549 | A | * | 3/1999 | Janes | 60/39.12 |
| 6,619,026 | B2 | * | 9/2003 | Carelli et al. | 60/39.17 |
| 6,637,183 | B2 | * | 10/2003 | Viteri et al. | 60/39.182 |
| 6,647,707 | B2 | * | 11/2003 | Dev | 60/39.43 |
| 6,675,585 | B2 | * | 1/2004 | Calvez et al. | 60/796 |
| 6,751,962 | B1 | * | 6/2004 | Kuwabara et al. | 60/800 |
| 6,796,130 | B2 | * | 9/2004 | Little et al. | 60/782 |
| 7,451,600 | B2 | * | 11/2008 | Patel et al. | 60/752 |
| 7,509,809 | B2 | * | 3/2009 | Patel et al. | 60/754 |
| 7,603,863 | B2 |  | 10/2009 | Widener et al. |  |
| 7,631,504 | B2 | * | 12/2009 | Belsom | 60/772 |
| 7,784,261 | B2 | * | 8/2010 | Little | 60/39.182 |
| 8,006,477 | B2 | * | 8/2011 | Dinu | 60/39.17 |
| 8,091,365 | B2 | * | 1/2012 | Charron | 60/752 |
| 2001/0047648 | A1 | * | 12/2001 | Griffiths | 60/39.04 |
| 2007/0271898 | A1 | * | 11/2007 | Little | 60/39.182 |
| 2009/0284013 | A1 |  | 11/2009 | Anand et al. |  |
| 2011/0072779 | A1 | * | 3/2011 | ElKady et al. | 60/39.23 |

* cited by examiner

Primary Examiner — William H Rodriguez
(74) Attorney, Agent, or Firm — Cantor Colburn LLP

(57) ABSTRACT

A power generation system is provided and includes a compressor to increase a pressure of inlet ambient air and a turbine downstream from the compressor having a first stage and additional stages downstream from the first stage, the first stage structurally incorporating a combustor in which the compressed ambient air is mixed with fuel and in which the mixture is combusted to generate high temperature exhaust gas from which mechanical energy is derived in the first and additional stages.

21 Claims, 3 Drawing Sheets

POWER GENERATION SYSTEM INCLUDING A FIRST TURBINE STAGE STRUCTURALLY INCORPORATING A COMBUSTOR

BACKGROUND OF THE INVENTION

The subject matter disclosed herein relates to a gas turbine engine with capability for exhaust gas recirculation with fuel injection from an early stage nozzle.

In normal operation, combined cycle gas turbine power plants generate significant amounts of oxides of nitrogen (NOx) and $CO_2$ as part of the combustion process. In recent years, the abatement of emissions, particularly NOx, has gained increased attention by the public and federal regulatory authorities, such as U.S. Environmental Protection Agency. Thus, significant resources have been dedicated to reducing and/or eliminating such unwanted emissions. In the burning of hydrocarbon fuels, particularly liquids, the oxides of nitrogen resulting from air fed to the combustor, as well as nitrogen compounds in the fuels themselves (such as pyridine), create pollutants that must be reduced in amount or abated before release to the atmosphere.

BRIEF DESCRIPTION OF THE INVENTION

According to one aspect of the invention, a power generation system is provided and includes a compressor to increase a pressure of inlet ambient air and a turbine downstream from the compressor having a first stage and additional stages downstream from the first stage, the first stage structurally incorporating a combustor in which the compressed ambient air is mixed with fuel and in which the mixture is combusted to generate high temperature exhaust gas from which mechanical energy is derived in the first and additional stages.

According to another aspect of the invention, a power generation system is provided and includes a compressor to compress ambient air, a turbine disposed downstream from the compressor and having a first stage and additional stages arranged downstream from the first stage, the first stage structurally incorporating a combustor in which the compressed ambient air and fuel are mixed and combusted to generate high temperature exhaust gas from which mechanical energy is derived in the first and additional stages and an exhaust gas recirculation (EGR) system disposed downstream from the turbine to receive the exhaust gas, the EGR system having an EGR compressor to compress the exhaust gas and conduits to supply the turbine with the compressed exhaust gas at the first and the additional stages.

According to yet another aspect of the invention, a turbine is provided and includes a first stage and additional stages downstream from the first stage to derive mechanical energy from high energy fluids supplied thereto and a combustor structurally incorporated in the first stage, the combustor including a combustor liner forming an annular or can-annular combustion zone extending upstream from first stage nozzles.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
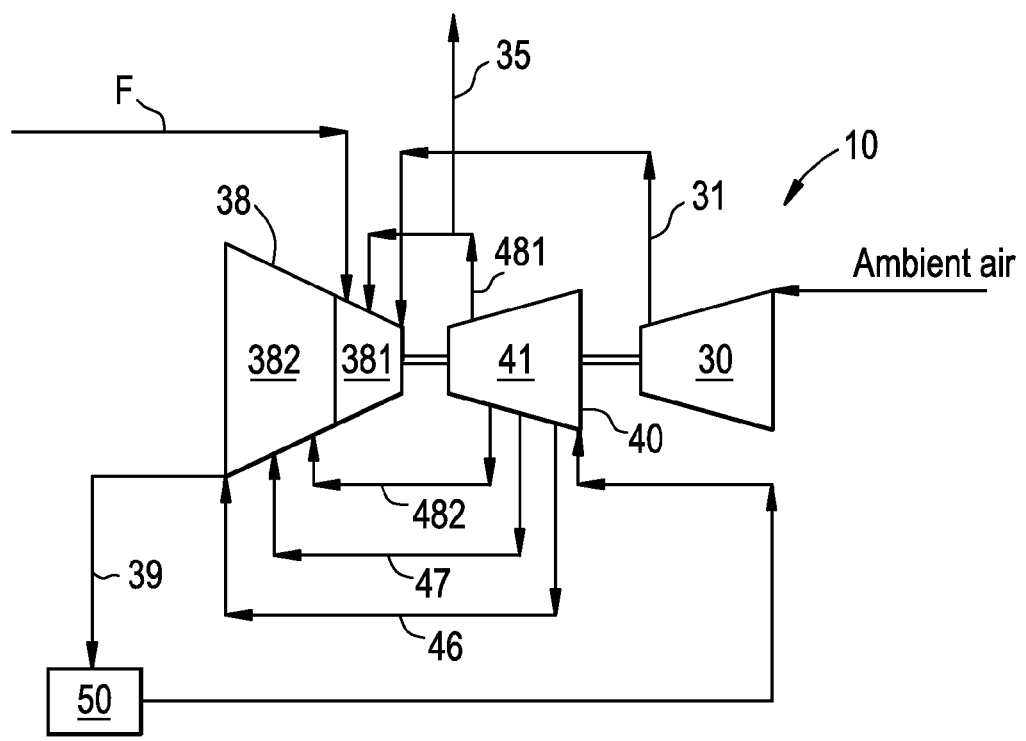
FIG. 1 is a schematic diagram illustrating a power generation system.

With reference to FIG. 1, a power generation system 10 is provided and includes an air compressor 30, a turbine 38 and an exhaust gas recirculation (EGR) system 40. The EGR system 40 is disposed downstream from the turbine 38 and includes an EGR compressor 41. Ambient air enters the air compressor 30, which compresses the ambient air that then passes at a significantly higher pressure (and slightly increased temperature) into the turbine 38 through feed line 31. The turbine 38 is disposed downstream from the air compressor 30 and has a first stage 381 and two or more additional stages 382, which are arranged downstream from the first stage 381. The first stage 381 structurally incorporates a combustor. Within this combustor, the compressed ambient air is mixed with fuel, F, and the air and fuel mixture is combusted to generate high temperature exhaust gas from which mechanical energy is derived in the first and additional stages 381, 382.

The fuel, F, may include a hydrocarbon fuel component, such as natural gas, which, when mixed with the compressed ambient air and combusted, generates the high temperature exhaust gas that serves as a main working fluid for the turbine 38. The turbine 38 in turn drives the air compressor 30 and the EGR compressor 41. Once it is at least partially spent, the high temperature exhaust gas, which includes near zero levels of $O_2$ and may be referred to as EGR exhaust for reasons that will be discussed below, is exhausted from the turbine 38 via feed line 39.

The power generation system 10 may further include a heat exchanger 50. The feed line 39 may direct the EGR exhaust to the heat exchanger 50 whereby heat is removed from the EGR exhaust for additional power generation and the EGR exhaust is cooled. This relatively cool EGR exhaust is then directed to the EGR compressor 41 where the EGR exhaust is compressed to a significantly higher pressure as a recycle stream. A primary conduit 481 supplies the first stage 381 of the turbine 38 with the compressed EGR exhaust from a high pressure stage of the EGR compressor 41. Secondary conduits 482, 47 and 46 supply the additional stages 382 of the turbine 38 with the compressed EGR exhaust from intermediate to low pressure stages of the EGR compressor 41. In addition, the power generation system 10 may further include a conduit 35 to provide compressed ambient air to feed plant bleed systems. The amount of compressed air may vary based on plant requirements and EGR $O_2$ concentration requirements.

Figure 2:
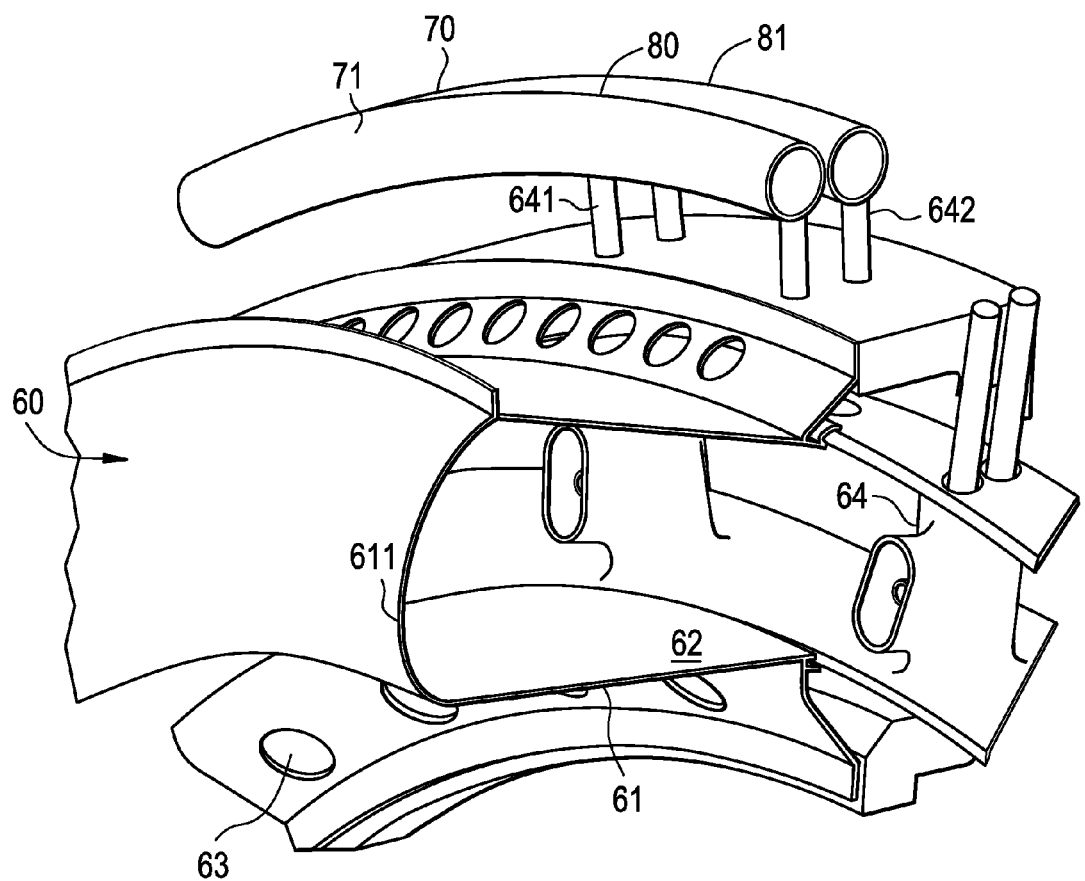
FIG. 2 is a perspective view of a first stage of a turbine of the power generation system of FIG. 1.
Figure 3:
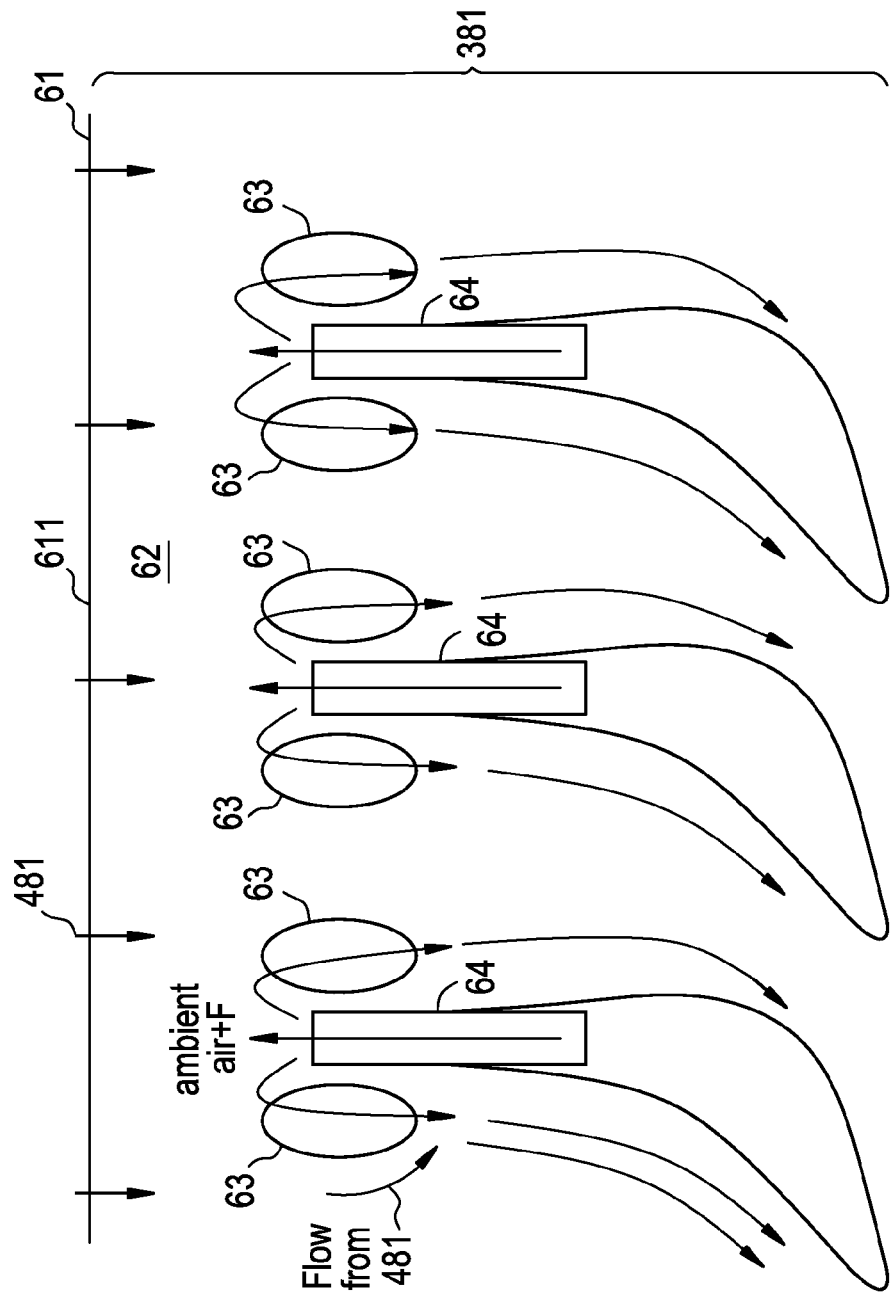
FIG. 3 is a schematic view of the first stage of FIG. 2.

With reference to FIGS. 2 and 3, the first stage 381 of the turbine 38 includes the combustor 60. The combustor 60 includes an annular combustor liner 61 that is formed to define a combustion zone 62 in which the combustion of the compressed ambient air and fuel, F, occurs. The annular combustor liner 61 is further formed to define cooling holes 63, which may be fed by at least a portion of the high pressure compressed exhaust gas as delivered by the primary conduit 481. A further portion of the high pressure compressed exhaust gas may be employed to cool the annular combustor liner 61 as well in accordance with effusion, dilution and/or film cooling processes.

The combustor 60 further includes an annular or can-annular arrangement of first stage nozzles 64, which are each fed via first and second radial spokes 641, 642. The first radial spokes 641 extend radially inwardly toward the nozzles 64 from a first external plenum 70 to supply the fuel, F, to the combustor 60. The first external plenum 70 may include a first annular manifold 71 having a substantially ovoid cross section. The second radial spokes 642 extend radially inwardly toward the nozzles 64 from a second external plenum 80 to supply the compressed ambient air output from the air compressor 30 to the combustor 60. The second external plenum 80 may include a second annular manifold 81 having a substantially ovoid cross section.

The annular combustor liner 61 extends circumferentially about a central longitudinal axis and in an upstream direction from the first stage nozzles 64. The annular combustor liner 61 includes an annular dome-shaped end part 611 at the upstream end. Thus, a mixing zone and the combustion zone 62 are each formed as an annular region upstream from the first stage nozzles. A plurality of combustion initiating devices, such as spark plugs, may be provided at the combustion zone 62 to selectively initiate combustion therein.

As shown in FIGS. 2 and 3, the compressed ambient air and the fuel, F, mix with one another slightly upstream from the first stage nozzles 64 and, while mixed, flow in the upstream direction toward the annular dome-shaped end part 611. Once combustion occurs, the fluids flow in the opposite direction past the first stage nozzles 64. The first stage nozzles 64 may be angled or otherwise provided with airfoil shapes so that the fluids can be direction to flow axially and circumferentially from the first stage nozzles 64 to turbine blades.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power generation system, comprising:
    a compressor to increase a pressure of inlet ambient air; and
    a turbine downstream from the compressor having a first stage and additional stages downstream from the first stage,
    the first stage structurally incorporating a combustor in which the compressed ambient air is mixed with fuel and in which the mixture is combusted to generate high temperature exhaust gas from which mechanical energy is derived in the first and additional stages,
    the combustor comprising an annular combustor liner including an annular dome-shaped end part at an upstream end of the annular combustor liner to define a mixing zone and a combustion zone as an annular region upstream from first stage nozzles.

2. The power generation system according to claim 1, wherein the additional stages comprise two or more additional stages.

3. The power generation system according to claim 1, further comprising an exhaust gas recirculation (EGR) system downstream from the turbine to receive the exhaust gas and to supply the turbine with the exhaust gas at the first and the additional stages.

4. A power generation system, comprising:
    a compressor to increase a pressure of inlet ambient air;
    a turbine downstream from the compressor having a first stage and additional stages downstream from the first stage, the first stage structurally incorporating a combustor in which the compressed ambient air is mixed with fuel and in which the mixture is combusted to generate high temperature exhaust gas from which mechanical energy is derived in the first and additional stages; and
    an exhaust gas recirculation (EGR) system downstream from the turbine to receive the exhaust gas and to supply the turbine with the exhaust gas at the first and the additional stages,
    wherein the EGR system comprises an EGR compressor to compress the exhaust gas.

5. The power generation system according to claim 4, wherein the EGR system further comprises a primary conduit to supply high pressure compressed exhaust gas from a high pressure stage of the EGR compressor to the first stage.

6. The power generation system according to claim 4, wherein the EGR system further comprises secondary conduits to supply intermediate and low pressure compressed exhaust gas from intermediate and low pressure stages of the EGR compressor to the additional stages.

7. The power generation system according to claim 1, wherein the turbine comprises a first external plenum to supply the fuel to the combustor.

8. The power generation system according to claim 7, wherein the first external plenum comprises a first annular manifold fluidly coupled to nozzles of the first stage.

9. The power generation system according to claim 1, wherein the turbine comprises a second external plenum to supply the compressed ambient air to the combustor.

10. The power generation system according to claim 9, wherein the second external plenum comprises a second annular manifold fluidly coupled to nozzles of the first stage.

11. A power generation system, comprising:
    a compressor to compress ambient air;
    a turbine disposed downstream from the compressor and having a first stage and additional stages arranged downstream from the first stage, the first stage structurally incorporating a combustor in which the compressed ambient air and fuel are mixed and combusted to generate high temperature exhaust gas from which mechanical energy is derived in the first and additional stages; and
    an exhaust gas recirculation (EGR) system disposed downstream from the turbine to receive the exhaust gas, the EGR system having an EGR compressor to compress the exhaust gas and conduits to supply the turbine with the compressed exhaust gas at the first and the additional stages.

12. The power generation system according to claim 11, wherein the additional stages comprise two or more additional stages.

13. The power generation system according to claim 11, wherein the conduits comprise:
    a primary conduit to supply high pressure compressed exhaust gas from a high pressure stage of the EGR compressor to the first stage; and secondary conduits to supply intermediate and low pressure compressed exhaust gas from intermediate and low pressure stages of the EGR compressor to the additional stages.

14. The power generation system according to claim 13, further comprising a combustor liner to form a combustion zone within the combustor, the combustor liner being cooled by the high pressure compressed exhaust gas.

15. The power generation system according to claim 13, wherein the turbine comprises:
   a first external plenum to supply the fuel to the combustor; and
   a second external plenum to supply the compressed ambient air to the combustor.

16. The power generation system according to claim 15, wherein the first external plenum comprises a first annular manifold fluidly coupled to nozzles of the first stage.

17. The power generation system according to claim 15, wherein the second external plenum comprises a second annular manifold fluidly coupled to nozzles of the first stage.

18. The power generation system according to claim 11, further comprising a conduit 35 coupled to the EGR compressor to provide compressed ambient air to feed plant bleed systems and to enable a decreased O2 exhaust concentration.

19. A turbine, comprising:
   a first stage and additional stages downstream from the first stage to derive mechanical energy from high energy fluids supplied thereto; and
   a combustor structurally incorporated in the first stage, the combustor including:
   a combustor liner forming an annular or can-annular combustion zone extending upstream from first stage nozzles.

20. The turbine according to claim 19, wherein the combustor liner comprises a dome-shaped end part at an upstream end thereof.

21. The turbine according to claim 19, wherein the combustor liner is formed to define cooling holes.

* * * * *